(No Model.)
H. R. FRISBIE.
VALVE.
No. 333,940. Patented Jan. 5, 1886.
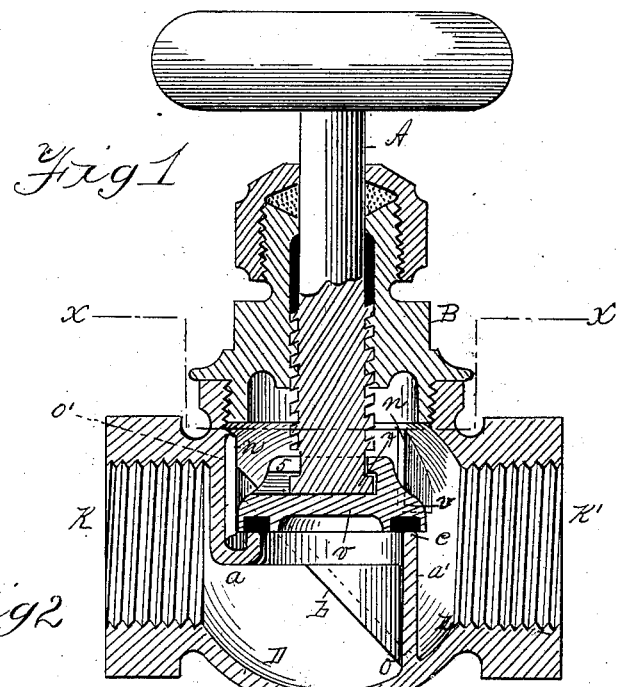
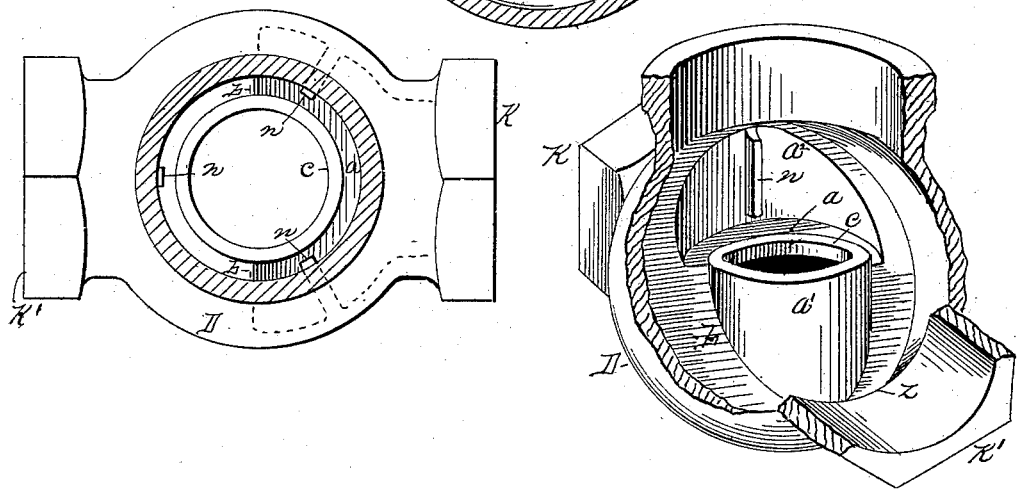
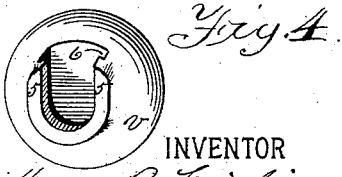
WITNESSES:
INVENTOR
Henry R. Frisbie
BY
Henry A. Chapin
ATTORNEY

UNITED STATES PATENT OFFICE.

HENRY R. FRISBIE, OF CROMWELL, ASSIGNOR TO THE PRATT & CADY COMPANY, OF HARTFORD, CONNECTICUT.

VALVE.

SPECIFICATION forming part of Letters Patent No. 333,940, dated January 5, 1886.

Application filed April 27, 1885. Serial No. 163,513. (No model.)

*To all whom it may concern:*

Be it known that I, HENRY R. FRISBIE, a citizen of the United States, residing at Cromwell, in the county of Middlesex and State of Connecticut, have invented new and useful Improvements in Globe and other Valves, of which the following is a specification.

This invention relates to improvements in globe and similar valves, the object being to provide an improved body therefor, embodying therein separated guide-points for a valve having a special connection with its spindle, as hereinafter described, and having an improved diaphragm construction, whereby less metal is required, a more rigid valve-seat is produced, and a less obstructed passage is made through the valve.

In the drawings forming part of this specification, Figure 1 is a longitudinal section of a globe-valve embodying my improvements. Fig. 2 is a plan view of the body of the valve, partly in section, the projecting portion of its hub nozzle or opening being removed on the line $x\,x$, Fig. 1. Fig. 3 is a perspective view of the globe-valve body before it is finished, a portion of its shell being broken away to more clearly show the improved diaphragm, valve-seat, and one of said valve-guides. Fig. 4 is a perspective top view of the valve proper.

In the drawings, D is the body of the valve. $n\,n\,n$ are valve-guiding projections on the interior of the latter, and located in that part thereof in which the valve moves toward and from its seat $c$. Said guides $n$ are located in the body D at different points, and extend in the direction of the movement of the valve $v$, and its spindle A serving to prevent any lateral movement of the valve on the latter, and not in the least obstructing the passage through the diaphragm in either direction. The circumference of the circle described by the inner faces of said guides is about that of the valve $v$, or a trifle greater than the latter, in order that it may move freely therebetween.

B is the hub of the valve, and is of ordinary construction.

The spindle A operates in the hub in the usual manner, and has a collar, $x$, around its lower end.

The valve proper, $v$, has formed on its upper side a socket to receive the lower end of the spindle A, and its collar $x$, consisting of a wall, 5, standing up at right angles to the face of the valve, the main portion of said wall being concentric with the border of the valve, but having an opening at one side, as shown. A groove, 6, is formed in the inner face of said wall, whereby provision is made for the reception in said socket of the collared end of the spindle A, as shown, whereby the latter and the valve are so connected that the former swivels or turns freely in the latter, and the valve is compelled to obey the movements lengthwise of the spindle; but no connection exists between the valve and the spindle to prevent the former from moving laterally off from the end of the latter; but the presence of the guides $n\,n\,n$ in the body D prevents any lateral movement of said valve and keeps it in a true position over its seat $c$ as it moves up and down over the latter.

The valve is guided by impact at three separate points, with guide-strips fixed on a portion of the globe-valve adjoining the periphery of the valve $v$, whereby the passage by and around the valve is unimpeded, but the latter is guided as aforesaid.

My improved diaphragm construction for valves of this class consists of the side portions, $b\,b$, thereof, extending substantially at an angle of forty-five degrees to the plane of the bearing-face of the valve-seat $c$, from the upper side of the end opening, K, to a point on the lower side of the globe part of the body D at $o$, considerably removed from the inner end, $z$, of the end opening, K', the line of said parts $b$ being from $o'$ to $o$, said diaphragm consisting also of the part $a$, extending toward the end K from the valve-seat, and in a plane with the latter but a little below its edge, and of the vertical part $a^2$, having a curve concentric with the valve-seat, and also of the cylindrical section $a'$, whose upper edge, $c$, constitutes the valve-seat, said section $a'$ opposite the end K' of the body D terminating at the junction point of the inclined parts $b\,b$ with said globe part of the body, and rising from said junction point $o$ in a straight line to its upper edge or seat, $c$, upon which the valve $v$ has a bearing operated by the spindle A to open and close the opening through the diaphragm.

In the construction above described, and shown in the drawings, it is seen that the valve $v$ has a bearing upon the edge or seat $c$, which is the end or border of the cylindrical section $a'$, and that said border does not, as is usually the case in prior constructions, overhang inwardly toward the center of the valve-opening, but is directly on the end of the wall $a'$, and that all valve-pressure on said border is resisted in a direct line, thereby providing a more rigid valve-seat than has heretofore been made. It will also be seen that since the position of the wall $a'$ is one whereby the latter is more than ordinarily removed from the point $z$ of the opening K' of the body D the passage from the end K' inward or from the end K through the valve-opening in the diaphragm from the latter outward through the end K', said passage is much more free than when the wall $a'$ has its side adjoining the opening K' close up to the point $z$, as is ordinarily the case in said earlier constructions; and, furthermore, in the construction herein shown and described, whereby the entire diaphragm, including the cylindrical valve-seat part thereof, is brought more nearly under the valve $v$, provides for the production of said parts by the employment of considerably less metal than has been required heretofore, the foot of the wall $a'$ terminating approximately midway between the point $z$ and the center of the opening through the diaphragm.

What I claim as my invention is—

In a globe-valve, a diaphragm consisting of the inclined portions $b\ b$, having their lower ends terminating at the point $o$ removed inwardly from the point $z$ of the opening K', the part $a$, the curved part $a^2$, and the cylindrical section $a'$, having the valve-seat $c$ on its upper edge, and having its side opposite said opening K' terminating directly under said valve-seat at the point $o$ on the interior of the valve-body D, substantially as set forth.

HENRY R. FRISBIE.

Witnesses:
WM. H. CHAPIN,
J. D. GARFIELD.